United States Patent
Tzeng (10) Patent No.: US 7,869,411 B2
(45) Date of Patent: Jan. 11, 2011

(54) COMPACT PACKET OPERATION DEVICE AND METHOD

(75) Inventor: Shrjie Tzeng, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 786 days.

(21) Appl. No.: 11/444,373

(22) Filed: Jun. 1, 2006

(65) Prior Publication Data

US 2007/0115966 A1 May 24, 2007

Related U.S. Application Data

(60) Provisional application No. 60/738,028, filed on Nov. 21, 2005.

(51) Int. Cl.
*H04W 4/00* (2009.01)
(52) U.S. Cl. .................. 370/338; 370/351; 370/352; 370/355; 370/356; 370/395.31; 370/389; 370/397; 370/491; 370/393; 455/418; 455/419; 455/420; 455/422.1; 455/450; 709/240
(58) Field of Classification Search .......... 370/338, 370/395, 389, 397, 401, 393, 351, 352, 355, 370/356; 455/418, 419, 420, 422.1, 450; 709/240
See application file for complete search history.

(56) References Cited

U.S. PATENT DOCUMENTS

| | | | |
|---|---|---|---|
| 5,414,704 A | 5/1995 | Spinney | |
| 5,423,015 A | 6/1995 | Chung | |
| 5,473,607 A | 12/1995 | Hausman et al. | |
| 5,555,398 A | 9/1996 | Raman | |
| 5,610,905 A | 3/1997 | Murthy et al. | |
| 5,644,784 A | 7/1997 | Peek | |
| 5,761,424 A | 6/1998 | Adams et al. | |
| 5,802,052 A | 9/1998 | Venkataraman | |
| 5,802,287 A | 9/1998 | Rostoker et al. | |
| 5,831,980 A | 11/1998 | Varma et al. | |
| 5,878,043 A * | 3/1999 | Casey ..................... | 370/397 |
| 5,892,922 A | 4/1999 | Lorenz | |
| 5,898,689 A | 4/1999 | Kumar et al. | |
| 5,909,686 A | 6/1999 | Muller et al. | |

(Continued)

FOREIGN PATENT DOCUMENTS

WO  199900944 A1  1/1999

OTHER PUBLICATIONS

Non Final Office Action for U.S. Appl. No. 10/985,033 mailed on Sep. 26, 2008, 16 pages.

(Continued)

*Primary Examiner*—Stephen M D'Agosta (57) ABSTRACT

A network device and a method of handling a frame in a network device defining a common header for each rule in a rules table of a search engine, wherein the common header comprises a source port specifying a corresponding rule to be applied to a port or ports, and a frame format specifying a format applied to the corresponding rule. A port receives a frame, with the frame having multiple field values. A pre-parser parses the received frame to obtain the field values and corresponding slices. A search engine receives the slices and determines matches between the slices and the common header of each rule in the rules table. A policy table performs indexing based on the determined matches to obtain an action entry. An action resolution takes an action based on the obtained action entry.

34 Claims, 4 Drawing Sheets

U.S. PATENT DOCUMENTS

| | | | |
|---|---|---|---|
| 5,940,596 | A | 8/1999 | Rajan et al. |
| 5,951,651 | A | 9/1999 | Lakshman et al. |
| 6,011,795 | A | 1/2000 | Varghese et al. |
| 6,041,053 | A | 3/2000 | Douceur et al. |
| 6,119,196 | A | 9/2000 | Muller et al. |
| 6,154,775 | A | 11/2000 | Coss et al. |
| 6,173,384 | B1 | 1/2001 | Weaver et al. |
| 6,246,680 | B1 | 6/2001 | Muller et al. |
| 6,259,699 | B1 | 7/2001 | Opalka et al. |
| 6,272,516 | B1 | 8/2001 | Angle et al. |
| 6,289,013 | B1 | 9/2001 | Lakshman et al. |
| 6,335,935 | B2 | 1/2002 | Kadambi et al. |
| 6,341,130 | B1 | 1/2002 | Lakshman et al. |
| 6,553,005 | B1 | 4/2003 | Skirmont et al. |
| 6,591,299 | B2 | 7/2003 | Riddle et al. |
| 6,606,681 | B1 | 8/2003 | Uzun |
| 6,651,099 | B1 | 11/2003 | Dietz et al. |
| 6,704,794 | B1 | 3/2004 | Kejriwal et al. |
| 6,775,245 | B1 | 8/2004 | Ishida et al. |
| 6,807,179 | B1 * | 10/2004 | Kanuri et al. .......... 370/395.31 |
| 6,904,057 | B2 | 6/2005 | Sarkinen et al. |
| 6,977,930 | B1 | 12/2005 | Epps et al. |
| 7,002,965 | B1 | 2/2006 | Cheriton |
| 7,095,738 | B1 | 8/2006 | Desanti |
| 7,167,443 | B1 | 1/2007 | Dantu et al. |
| 7,170,893 | B2 * | 1/2007 | Rajan et al. ................. 370/393 |
| 7,187,694 | B1 | 3/2007 | Liao |
| 7,200,144 | B2 * | 4/2007 | Terrell et al. ................ 370/389 |
| 7,233,597 | B2 | 6/2007 | Kumar et al. |
| 7,317,723 | B1 | 1/2008 | Guru et al. |
| 7,406,088 | B2 * | 7/2008 | Magd et al. ................. 370/401 |
| 7,464,181 | B2 * | 12/2008 | Corl et al. ................... 709/240 |
| 7,606,263 | B1 | 10/2009 | Parker |
| 2001/0021189 | A1 | 9/2001 | Shiota |
| 2002/0116526 | A1 | 8/2002 | Brown |
| 2003/0053414 | A1 | 3/2003 | Akahane et al. |
| 2003/0076830 | A1 | 4/2003 | Asano |
| 2003/0152078 | A1 | 8/2003 | Henderson et al. |
| 2003/0156586 | A1 | 8/2003 | Lee et al. |
| 2003/0225881 | A1 | 12/2003 | Saxena et al. |
| 2004/0062267 | A1 | 4/2004 | Minami et al. |
| 2004/0100950 | A1 | 5/2004 | Basu et al. |
| 2004/0215870 | A1 | 10/2004 | Chow et al. |
| 2004/0215917 | A1 | 10/2004 | Lambeth et al. |
| 2005/0105912 | A1 | 5/2005 | Laufer |
| 2005/0125424 | A1 | 6/2005 | Herriott et al. |
| 2005/0135399 | A1 | 6/2005 | Baden et al. |
| 2005/0226235 | A1 | 10/2005 | Kumar et al. |
| 2006/0187919 | A1 | 8/2006 | Lee et al. |
| 2008/0049774 | A1 | 2/2008 | Swenson et al. |

OTHER PUBLICATIONS

Final Office Action for U.S. Appl. No. 10/985,033 mailed on May 29, 2008, 14 pages.
Non Final Office Action for U.S. Appl. No. 10/985,033 mailed on Jan. 8, 2008, 12 pages.
Non Final Office Action for U.S. Appl. No. 11/165,495 mailed on Dec. 1, 2008, 20 pages.
Non Final Office Action for U.S. Appl. No. 11/165,495 mailed on Jun. 19, 2008, 23 pages.
Office Action for U.S. Appl. No. 11/165,495, mailed on Aug. 5, 2009, 16 pages.
Office Action for U.S. Appl. No. 11/165,495, mailed on Mar. 5, 2010, 26 pages.
Advisory Action for U.S. Appl. No. 10/985,033, mailed on Oct. 22, 2009, 3 pages.
Office Action for U.S. Appl. No. 10/985,033, mailed on Feb. 4, 2010, 29 pages.
Office Action for U.S. Appl. No. 10/985,033, mailed on Jul. 21, 2009, 27 pages.
Advisory Action for U.S. Appl. No. 10/985,033, mailed on Aug. 26, 2008, 3 pages.
Office Action for U.S. Appl. No. 11/340,586, mailed on Feb. 22, 2010, 16 pages.
Office Action for U.S. Appl. No. 11/340,586, mailed on May 27, 2009, 15 pages.
Office Action for U.S. Appl. No. 11/341,643, mailed on Feb. 4, 2010, 20 pages.
Office Action for U.S. Appl. No. 11/341,643, mailed on Jun. 12, 2009, 25 pages.
U.S. Appl. No. 10/985,033 Notice of Allowance mailed Jun. 28, 2010, 25 pages.

* cited by examiner

| MAC DA (Byte 0 ~ Byte 3) ||||
|---|---|---|---|
| MAC DA (Byte 4 ~ Byte 5) || MAC SA (Byte 0 ~ Byte 1) ||
| MAC SA (Byte 2 ~ Byte 5) ||||
| TPID 1 = 9100H || SPVID (16bits) ||
| TPID 2 = 8100H | .1q_priority (3 bits) / CFI | VID (12bits) ||
| Ether Type = 0800 (for IP) | IP_version | IP_Header Length | TOS/DSCP[7:0] |
| IP_total_length || IP_Identification [15:0] ||
| IP_flag [2:0] | IP_fragment offset [12:0] | IP_TTL [7:0] | IP_protocl[7:0]==6 (for TCP) |
| IP_header_checksum[15:0] || source_IP (Byte 0 ~ Byte 1) ||
| source_IP (Byte 2 ~ Byte 3) || Destination_IP(Byte 0~Byte 1) ||
| Destination_IP (Byte 2 ~ Byte 3) || L4_source_port [15:0] ||
| L4_destination_port [15:0] || Sequence Number (Byte 0 ~ Byte 1) ||
| Sequence Number (Byte 2 ~ Byte 3) || Acknowledge Number ( Byte 0 ~ Byte 1) ||
| Acknowledge Number (Byte 2 ~ Byte 3) || Data Offset | Reserved | URG ACK RST SYN FIN |
| Window ||||
| CRC (32 bits) ||||

FIG.4

COMPACT PACKET OPERATION DEVICE AND METHOD

CROSS-REFERENCE TO RELATED APPLICATIONS

This application claims priority of U.S. Provisional Patent Application No. 60/738,028, filed on Nov. 21, 2005. The subject matter of this earlier filed application is hereby incorporated by reference.

BACKGROUND OF THE INVENTION

1. Field of the Invention

The present invention relates to a compact packet operation apparatus and method to filter and classify packets using user defined field and packet formats; and more particularly to an apparatus and method maximizing set-up and implementation of rules in a Compact Fast Field Processor (CFP).

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known Ethernet technology, which is based upon numerous IEEE Ethernet standards, is one example of computer networking technology which has been able to be modified and improved to remain a viable computing technology.

Based upon the Open Systems Interconnect (OSI) 7-layer reference model, network capabilities have grown through the development of repeaters, bridges, routers, and, switches, which operate with various types of communication media. Collectively, with respect to the present invention, all of these may be referred to as network devices. Switches, as they relate to computer networking and to Ethernet, are hardware-based devices which control the flow of datagrams, data packets or cells based upon destination address information which is available in each packet. A properly designed and implemented switch should be capable of receiving a packet and switching the packet to an appropriate output port at the maximum speed capability of the particular network However, many of these enhanced handling modules, such as a FFP, can be difficult to scale to higher bandwidths, and does not classify/filter across ports. Neither Masks nor Meters, that can be a part of the filtering, can usually be shared across ports. Additionally, there are aspects of the current FFP that are not flexible enough and other aspects that are for the most part overly general. These issues primarily have to do with the selection of bits with which to filter. Some applications might require filtering on bits and/or fields that are even further in the packet than a set limit that most system have. In many filtering systems, this limit may be 80 Bytes. In opposite, many applications—such as the Access Control List (ACL) application—in general only need to filter on a few (for example, 5) specific fields from within the packet and do not require such an extensive bit selection mechanism. Finally, the searching mechanism of the FFP and similar filtering systems does not scale, and will not hold up under the increased bandwidth requirements of future devices with multiple 10 GE ports.

As such, there is a need in the prior art to have a system that has a scalable design with a hardware support able to keep the internal frame format uniform in all conditions so that design will be less buggy. A Compact Fast field device and process is needed that would provide a versatile filter and classification engineer and provides a single unified design for the device.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which.

DETAILED DESCRIPTION OF THE PREFERRED EMBODIMENTS

According to an embodiment of the present invention, there is provided a network device and method to maximize a set-up and implementation of rules in a Compact Fast Field Processor (CFP). Rather than providing separate search engines to correspond to each particular port, thereby making the device expensive, the present invention allows for a single rules table to be set-up or programmed in such a way that it may be applied to multiple slices associated with multiple ports. Also, the present invention allows the user to easily set-up or define the rules in the search engine to include a common header including at least a source port field, specifying the port or ports to which a corresponding rule is to apply and a frame format field, specifying the frame format to which the rule will be applied. The present invention keeps an internal frame format uniform for all rule conditions so that a chip design is less buggy.

Figure 1:
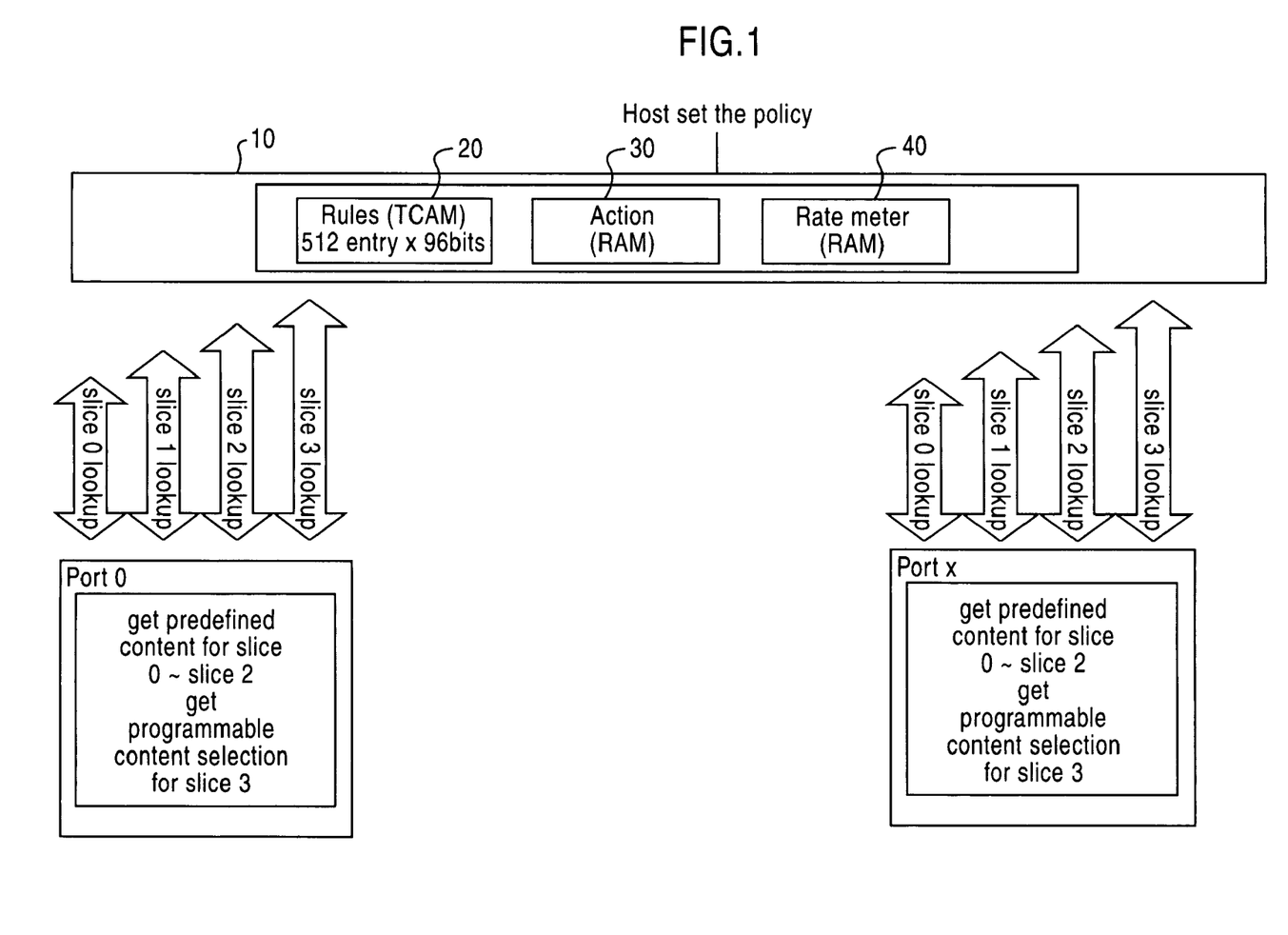
FIGS. 1 and 2 illustrate a Compact Fast Field Processor (CFP), in accordance with an embodiment of the present invention.
Figure 2:
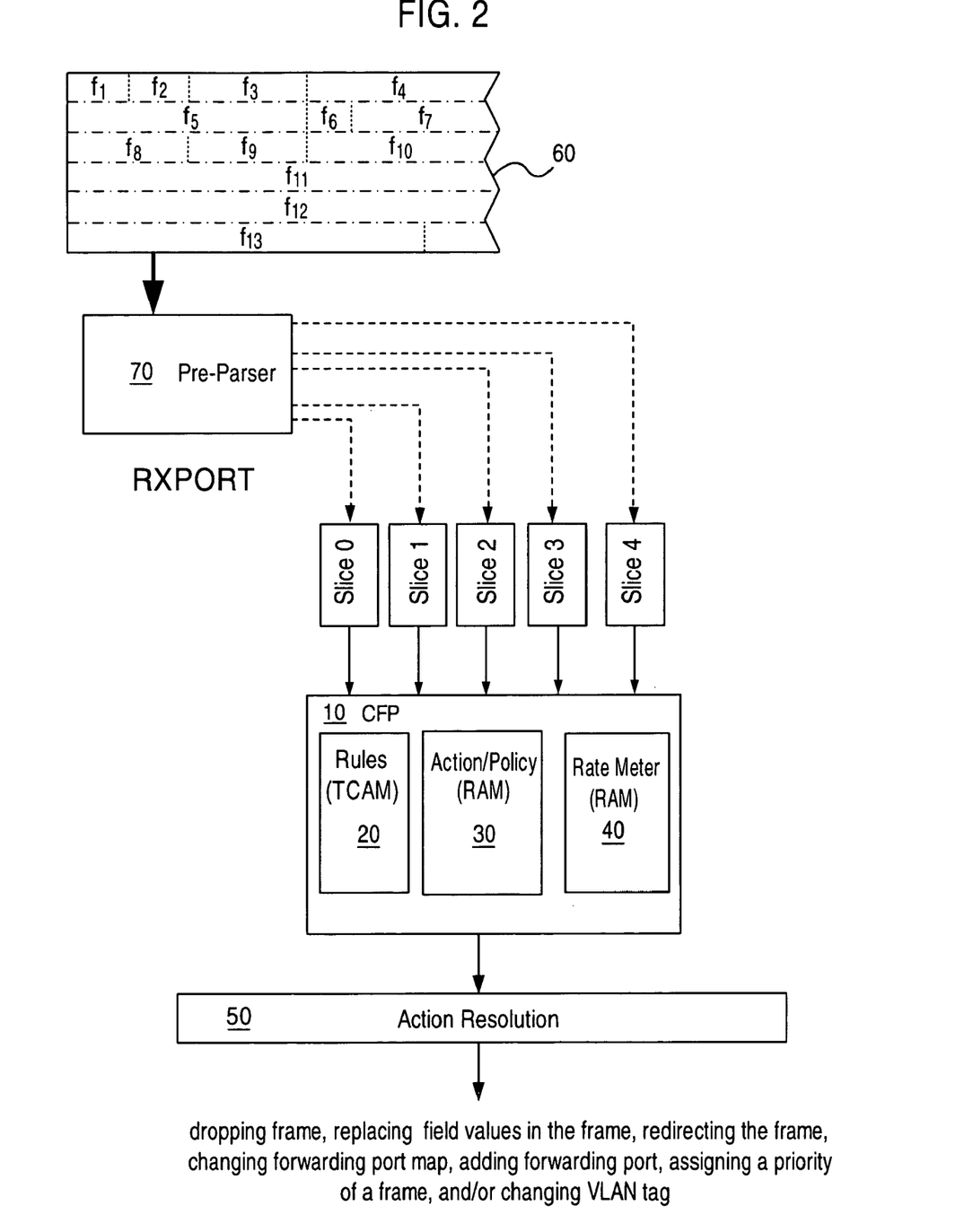

FIGS. 1 and 2 illustrate a Compact Fast Field Processor (CFP), in accordance with an embodiment of the present invention. The CFP is a versatile filter and classification engine. Inputs of CFP includes the fields from a packet header, some user defined fields, and packet format. All of the inputs are provided by a receiving port. The fields of the packet header, also referred to as slices, are fed to a search engine, which may be provided through a Ternary Content-Addressable Memory (TCAM). In one example each slice may be 96 bits wide; however, a person of ordinary skill in the art will appreciate that the number of bits may vary.

FIG. 1 illustrates a number of rxports, port 0 to port x, each transmitting slices 0 to 3 to the CFP for lookup, in accordance with an embodiment of the present invention. A slice is data extracted from the packet that is sent to the CFP 10 for lookup. In an embodiment of the present invention, each port may provide a predetermined number of slices, the number depending upon bandwidth and application. The CFP 10 includes the TCAM 20, which includes a rules table having 512 rules and each rule having 114 bits expected data and 114 bit mask selection. All slices are received by the TCAM 20, which is capable of classifying packets and generating actions based on that classification.

A Binary Cam is a memory that contains a function to first compare data bits on a primary input bus (which is the width of the memory) with all of the entries in the memory. The result of the comparison outputs an address for which entry matched. If there is more than one match, the entry with the lowest physical address is the highest priority. The TCAM 20 has the same mechanism but in addition has a mask per entry. The mask selects which bits in the memory entry are required to match exactly with the bits from the primary input bus, in order to determine if there is a match.

The CFP 10 may also include an action or policy table 30, having one entry per TCAM entry, with each serving an action resolution block 50. The actions associated with a match are contained in the policy table 30. One or multiple actions may be performed based on the rules in the TCAM 20. Through a host, a user may define the actions that may be applied when a match occurs for a particular slice. A user may set or define multiple rules to be executed for parallel searching using a single engine. The user may assign actions to be taken when a match has been found. Some of the actions that may be supported are dropping the frame, replacing field values in the frame, redirecting the frame, changing forwarding port map, adding forwarding port, assigning a priority of a frame, and/or changing VLAN tag.

The CFP 10 also may include a rate meter defining a rate each frame or slice is to be processed and output. The rate meter may include statistics for each rule. The statistics would be a number associated with the particular type of frame or slice being process allowing the user to know the rate of occurrence of the frame being received, processed, and output.

In accordance with an embodiment of the present invention, one purpose for using the CFP 10 may be to implement an Access Control List (ACL). An ACL is a way to specify particular functions that may be associated with a particular user. One example is to limit the total bandwidth to/from a user to only 10 Mbit/sec. Another example is to treat voice traffic from a user to another user as high priority if the bandwidth does not exceed 5 Mbits/sec, and as low priority if it does. Another function would be to implement some non-standard actions. For instance, some frames may use non-standard MAC address or some topologies may need to send frames out even if the port is in a blocking state.

FIG. 2 illustrates a packet 60 having multiple fields in a header of the packet 60. A pre-parser 70 parses the packet to obtain field values from the packet 60. Slices 0 to 4 are field contents sent to the CFP 10 for lookup. It is noted that the parsing occurs on a per rxport basis and the number of field values obtainable is dependent on the number of slices for the CFP 10. Thus, as illustrated, for the case when the CFP 10 is to process five slices, then the rxport can filter the received packet based on five hits from the five slices. There may be seven different formats of slices defined in the chip. Depending on the setting of SLICE_SEL_MAP_REG in TCAM 20, the rxport selects the slices to send to the CFP 10.

The present invention provides a flexible architecture parameter, CFP_SLICE_NUM, in which the number of slices searched for a particular frame can be adjusted for various projects depend on their bandwidth requirement. As shown in FIG. 2, in accordance with an embodiment of the present invention, there is just one parallel search engine TCAM 20 in the CFP 10.

Once the lookup request is granted, the rxport sends each slice for comparison from slice 0 to slice 3 (CFP_SLICE_NUM-1) to the rules table (TCAM 20). In one embodiment, for packets transmitted from all or any port, slices 0 to 2 are predefined and slice 3 is per port programmable. The TCAM 20 performs parallel lookup by performing a parallel comparison at wire speed between the slices and the rules in the rules table. A benefit of this approach is to provide a simpler configuration and reduce cost by reducing the number of search engines required to perform the lookup. For slices 0 to 4 illustrated in FIG. 2, five searches are to be performed in parallel for the same rule and action data base. There can be no match after each search or there can be only one match. When multiple matches in the rule, the match with the highest priority is acknowledged. Therefore, all the rules have an associated priority level and only one action can be taken for one packet on the lookup per slice. Because five slices are provided, five matches may exist for one packet. No matter how many matches after these five look-ups, the match with the highest priority is acknowledged. The CFP 10 may examine up to the 80$^{th}$ byte of a frame.

In order to allow performing parallel searches of multiple slices using a single search engine, for all slices, a common slice format may include {valid (1 bit), SLICE_ID (3 bits), SRCPORT (6 bits), SLICE_COMMON_FIELDS (6 bits), slice specific fields}. For each slice, there is a common header or SLICE_COMMON_FIELDS programmed in each rule in the TCAM rules table 20. The common header is the same for all slices corresponding to a same packet. The intention of using SLICE_COMMON_FIELDS is to reduce the number of rules in the TCAM rules table 20 that are required to correctly constraint a flow. For example, the common header includes a source port number (i.e., source_port), and a frame format number (i.e., frame_format). The rules in the TCAM rules table 20 need to be defined to indicate to which source a particular rule is to be applied to. Thus, the source port number is used to specify a rule in the rules table to be applied to the port or ports. For instance, the source port number in the common header of the slices may be defined so that a rule applies to all ports, to only even ports, or to only a specific port. The rules table would be set-up so that each rule is defined to apply to a specific port or ports, such as source_port [4:0]==xxxxx, for rules to be applied to all ports, source_port [4:0]=xxxx0, for rules to be applied to even ports, and source_port[4:0]==00001, for rules to be applied to port 1 only. The rules in the rules table would be configured in such a way that the user may selectively apply certain rules to certain ports only. Accordingly, using the rules, the user may define a manner in which a particular frame should be processed with respect to other frames, such as processing priority for each frame.

In some protocol standards, such as Ethernet IEEE 802 Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), GARP (Generic Attribute Registration Protocol) VLAN Registration Protocol (GVRP), serial line Internet protocol/point to point protocol ("SLIP/PPP"), or customized or non-standard interface protocols, for instance, different frame formats may use different types of formats. Accordingly, another part of the common header includes the frame_format, which is used to specify which frame format a particular rule in the rules table will be applied to. In accordance with an embodiment of the present invention, there may be seven defined frame formats, 1q_tagged, double_tagged, 802_2_frame (no_tagged), cpu_frm, brcm_tagged, stack_frm, and stack_tagged. For instance, the rules in the rules table would be configured in such a way that the user may selectively apply certain rules to certain frame format or formats only. For instance, some rules may be defined to apply to frames from a CPU only; thus, the frame format may be defined as follows: frame_format[6:0]==000_1000. Other rules may be defined to apply to frames from non-CPUs only; thus, the frame format may be defined as follows: frame_format[6:0]==xxx_0xxx. In the alternative, the rules in the rules table may be defined to apply to frames from a stacking port with a stacking header only, thus, the frame format would be defined as follows: frame_format[6:0]==000_0011.

Thus, rather than providing separate rules tables to correspond to each particular port, thereby making the system expensive, the present invention allows for a single rules table in a search engine (e.g., TCAM 20) to be set-up or programmed in such a way that it may be applied to multiple slices associated with multiple ports. Also, the present invention allows the user to easily define the rules in the TCAM 20 to include a common header including at least a source port field specifying which port or ports a corresponding rule is to apply and a frame format field specifying which format the rule will be applied to.

The rate meter chooses the action as the final action depending on a rate of the flow. The lookup result is sent to an action resolution module. The action resolution module 50 includes an in-band action and an out-band action for each rule in the based on the various conditions. The in-band action is applied when the slices associated with a frame contain identification information for the desired virtual connection, and this frame is to be transmitted through the CFP 10 to a receiver (not shown). The out-band action is applied when the slices associated with a frame do not contain identification information for the desired virtual connection, and this frame is to be transmitted through the CFP 10 to a receiver (not shown). Some actions that the CFP 10 may perform are re-directing a frame, copy to a port, assign a priority to a port, drop the frame, etc. A person of ordinary skill in the art will appreciate that other actions may be implemented.

Figure 3:
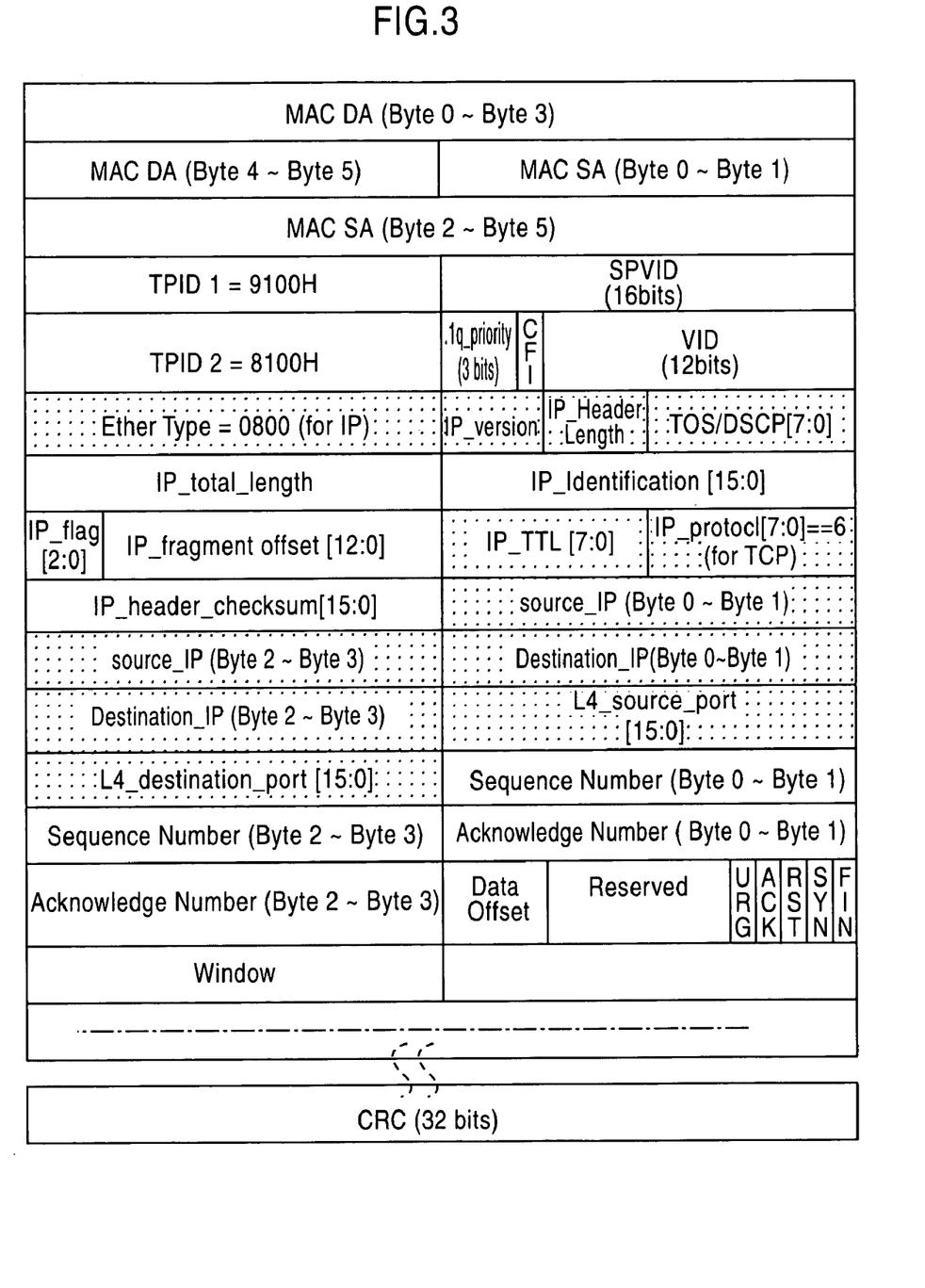
FIG. 3 illustrates fields a port sends to the CFP for lookup, in accordance with an embodiment of the present invention.

FIG. 3 illustrates the fields that rxport needs to send to the CFP 10 for lookup. It is assumed that all the frames include an .ISP_tag(TPID+SPVID), 1q tag in all case. One ISP_tag is added when double tagging mode is enabled. When double tagging mode is not enabled, the TPID and SPVID will always be tagged with zeros. When 802.1q is not enabled, for all frames, it will also added by default .1q tag. The bits in SLICE_COMMON_FIELDS to differentiate each format of a frame. Rxport is responsible to generate correct SLICE_COMMON_FIELDS.

The fields of interest that may be parsed from the packet are listed below. There are standard Ethernet fields as well as user defined fields.
 Destination MAC address (MAC_DA, 48 bits)
 Source MAC address (MAC_SA, 48 bits)
 Outer Tag Protocol ID (TPID 1, 16 bits)
 Service Provider VID (SPVID, 16 bits)
 Inner Tag Protocol ID (TPID2, 16 bits)
 User VID (USRVID, 16 bits=1q_pri+CFI+VID)
 EtherType (ETYPE, 16 bits)
 IP version (IP_VERSION, 4 bits)
 IP header length (IP_LETH, 4 bits)
 TOS field (IP_TOS, 8 bits, also share with DSCP (6 bits) and CU (2 bits))
 IP time to live (IP_TTL, 8 bits)
 IP protocol field (IP_PROTOCOL, 8 bits)
 Source IP address (IP_SA, 32 bits)
 Destination IP address (IP_DA, 32 bits)
 Layer 4 source port number (L4_SP, 16 bits)
 Layer 4 destination port number (L4_DP, 16 bits)
 TCP flags (TCP_FLAG, 6 bits)
  SYN, FIN, ACK, FRAG, RST, PSH
 User define field 0 (UDF 0, 8 bits)
 User define field 3 (UDF 3, 32 bits)
 User define field 5A (UDF5A, 32 bits)
 User define field 5B (UDF5B, 32 bits)
 User define field 5C (UDF5c, 24 bits)
 User define field 6A (UDF6A, 32 bits)
 User define field 6B (UDF6B, 32 bits)
 User define field 6C (UDF6C, 32 bits)

For policy that only applies to a specific format of frame, the user can disable the corresponding frame format by setting the masking bit of the corresponding bit to ignore. Also, the user can use the masking bit to select a rule to only apply to a desired type of port. One example is that the user can configure some rules only to apply to the front port (network port). But it does not apply to stacking port and CPU port, even if the packet format actually matches the packet data lookup in the rules table. An exemplary detail format is defined below. Receive port has to generate SLICE_COMMON_FIELDS information and provides them for CFP lookup.

| Field | Width | Description (total 6 bits) |
|---|---|---|
| 1QTAGGED | 1 bit | 1 = 802.1Q tagged frame, 0 = not 802.1Q tagged frame |
| DTTAGGED | 1 bit | 1 = Double tagged frame, 0 = not double tagged frame. Note, refer to global register for the definition of double tagged frame. |
| EII_OR_8023_FRM | 1 bit | 1 = Ethernet II frame or 802.3 frame, 0 = not Ethernet II frame or 802.3 frame<br>Note: IEE802.3 and Ethernet II has the same offset for upper layer fields |

If a single tagged frame is received, then one bit may be added to make it double tagged. If a double tagged frame is received, then no bit may be added. If frame is received that has no tag, then two bits may be added to make it double tagged.

As previously indicated, slices 0 to 2 are predefined slices. In accordance with an exemplary embodiment, for slice 0 field selection definition, the following definition applies: source_port, frame_format, MACDA, MACSA, where MACDA is the destination MAC address and MACSA is the source MAC address. Thus, for slice 0 field selection definition, the following fields are predefined fields in the rules table for an entire chip.

| Field | width | Description (118 bits in total) |
|---|---|---|
| VALID | 1 bit | Valid bit. The mask bit must be set to 1 |
| SLICEID | 3 bit | Slice ID. For slice 0, set to 3'b000. |
| SRCPORT | 6 bits | Source port ID. TCAM is used here, for rules apply to all the ports, the user can set the masking bits to ignore SRCPORT so that the rules can apply to all the ports. This means one entry in the rule is needed for the entire chip. |
| SLICE_COMMON_FIELDS | 6 bits | Frame format |
| MACDA | 48 bits | Destination MAC address |
| SPVID[11:0] | 12 bits | Lower 12 bits of Service Provider VID |
| USRVID[11:0] | 12 bits | Lower 12 bits of User VID |
| ETYPE | 16 bits | EtherType |
| UDF0 | 8 bits | User define field 0 - A consecutive one byte frame data defined by per port register UDF0_OFFSET. |

-continued

| Field | width | Description (118 bits in total) |
|---|---|---|
| SP_STATE | 3 bits | Spanning tree state of the frame. The SP_STATE can be from per port spanning tree state or from MSTP table lookup depend on the STP mode in the chip. |

In accordance with an exemplary embodiment, for slice 1 field selection definition, the following definition applies: source_port, frame_format, tag_id, VLAN_tag, Length/Type, IP_protocol, IP_version, IP_DSCP, IP_TTL, UDF0, where TTL is a time-to-live and UDF is a user defined field. Thus, for slice 1 field selection definition, the following fields are predefined fields in the rules table for the entire chip.

| Field | width | Description (118 bits in total) |
|---|---|---|
| VALID | 1 bit | Valid bit. The mask bit must be set to 1 |
| SLICEID | 3 bit | Slice ID. For slice 1, set to 3'b001. |
| SRCPORT | 6 bits | Source port ID. TCAM is used here, for rules apply to all the ports, the user can set the masking bits to ignore SRCPORT so that the rules can apply to all the ports. This means one entry in the rule is needed for the entire chip. |
| SLICE_COMMON_FIELDS | 6 bits | Frame format |
| MACSA | 48 bits | Source MAC address |
| IPv4_VALID | 1 bit | 1'b1 means rule apply to IP v4 frame only. For rx port, if the corresponding frame is not a IP v4 frame, when lookup, rxport will set 1'b0 here. |
| IP_SA | 32 bits | Source IP address |
| USRVID | 16 bits | 1q_pri + CFI + VID |
| RESV | 2 bits | Reserved |

In accordance with an exemplary embodiment, for slice 2 field selection definition, the following definition applies: source_port, IP_DA, L4_destination_port, L4_source_port, UDF1, where DA is a destination address and UDF is a user defined field. Thus, for slice 2 field selection definition, the following fields are predefined fields in the rules table for the entire chip.

| Field | width | Description (118 bits in total) |
|---|---|---|
| VALID | 1 bit | Valid bit. The mask bit must be set to 1 |
| SLICEID | 3 bit | Slice ID. For slice 2, set to 3'b010. |
| SRCPORT | 6 bits | Source port ID. TCAM is used here, for rules apply to all the ports, the user can set the masking bits to ignore SRCPORT so that the rules can apply to all the ports. This means one entry in the rule is needed for the entire chip. |
| SLICE_COMMON_FIELDS | 6 bits | Frame format |
| MACDA | 48 bits | Destination MAC address |
| IPv4_VALID | 1 bit | 1'b1 means rule apply to IP v4 frame only. For rx port, if the corresponding frame is not a |

-continued

| Field | width | Description (118 bits in total) |
|---|---|---|
| | | IP v4 frame, when lookup, rxport will set 1'b0 here. |
| IP_SA | 32 bits | Source IP address |
| USRVID | 16 bits | 1q_pri + CFI + VID |
| RESV | 2 bit | Reserved |

As previously indicated, slices 3 and on are per port programmable slices, which fields may vary depending on a particular application. Thus, for slices 3 and on field selection definitions, the following fields may be fields in the rules table for the entire chip.

| Field | width | Description (118 bits in total) |
|---|---|---|
| VALID | 1 bit | Valid bit. The mask bit must be set to 1 |
| SLICEID | 3 bits | Slice ID. For slice 4, set to 3'b100 |
| SRCPORT | 6 bits | Source port ID. TCAM is used here, for rules apply to all the ports, the user can set the masking bits to ignore SRCPORT so that the rules can apply to all the ports. This means one entry in the rule is needed for the entire chip. |
| FORMAT | 6 bits | Frame format |

In accordance with a further embodiment of the present invention, multiple slices can be chained to form a single rule. Specifically, the user can chain different slices to form a rule that may require more fields than one single slice. It is not a valid setting to chain the same slice together. To enable slice chaining, the user may set the chain_id in the action field. The width of the chain_id may be 5 bits. Chain_id equal to zero means that the slice is not chained. So, effectively, thirty-one chained rules may be constructed. Once the slice chaining is enabled, it can chain all CFP_SLICE_NUM slices together. For rules that do not need to compare a particular slice, the user needs to set the mask bit so that it will always match. Also, the user is able to set the priority for each rule.

The following illustrates the chaining mechanism. Assuming that two rules exist, rule 1 is a chained rule and it has lower priority than rule 2. Rule 1 will need to occupy four slices, from slice 0 to slice 3. Assuming that rule 2 only needs to check slice 1, to guarantee that rule 2 has a higher priority than rule 1, the user needs to set the priority of slice 1 to be higher than the priority of rule 1. To do so, assuming that chained rule 1 is programmed at addresses 20 to 23, the user may program rule 2 at an address lower than address 20, and thereby rule 2 has a higher priority than rule 1. If, for some application reason, rule 1 is of a higher priority than rule 2 and rule 1 is programmed at addresses 20 to 23, rule 2 may be programmed at an address higher than address 23.

In accordance with an embodiment of the present invention, it is not required to have chained rule programmed next to each other. Different slices in a chain may be program at random locations. It is the priority of each slice that determines the location of a rule. The user may define the priority of each rule and each chained rule needs to have a unique ID.

Accordingly, the present invention provides for a compact fast field device and method as a versatile filter and classification engine. The input of CFP 10 includes the fields from packet header, some user defined field and packet format. A rules table in the CFP 10 provides a programmable and user friendly rule set-up, thereby allowing parallel searches be performed on multiple slices using the same search engine.

The user is able to easily and consistently configure the format for the rules in the rules table. Each rule would include a common header allowing parallel searches of the slices.

Figure 4:
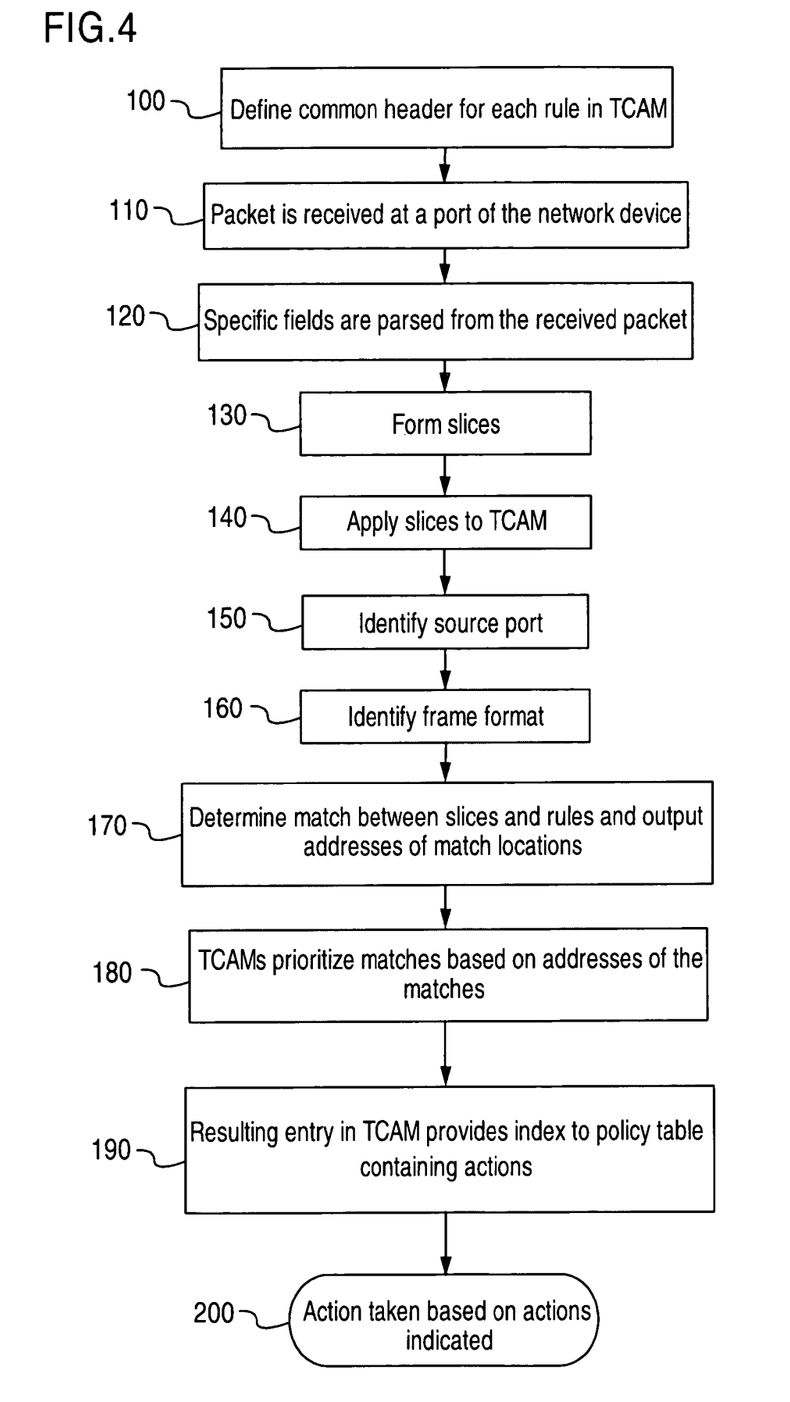
FIG. 4 illustrates a flow chart showing the CFP process of handling slices using a rules table in a single search engine, in accordance with an embodiment of the present invention.

FIG. 4 illustrates a flow chart showing the CFP process of handling slices using a rules table in a single search engine (TCAM 20), in accordance with an embodiment of the present invention. At operation 100, a common header is defined for each rule in the TCAM 20 including the source port and the frame format a corresponding rule is to be applied to. At operation 110, a packet is received at a port of a network device. At operation 120, specific fields are parsed from the received packet.

At operation 130, the slices that are applied to the TCAM 20 for lookup are formed. At operation 140, the slices are applied to the TCAM 20. At operation 150, the source port is identified, thereby identifying the rules to be applied. At operation 160, the frame format is identified, thereby identifying the frame format to which the rule will be applied. At operation 170, the TCAM 20 is used to determine if there is a match between the common header of the slices and the rules in the TCAM 20 rules table, and addresses of matched locations are output. At operation 180, the matches are prioritized based on their addresses. At operation 190, a resulting entry in TCAM 20 provides an index to a policy table containing actions. At operation 200, the actions are taken on the indicated actions in the policy table are taken.

It is to be understood that in one embodiment of the present invention, the operations of FIG. 4 may be performed in the sequence and manner as shown although the order of some operations and the like may be changed without departing from the spirit and scope of the present invention.

In addition, the invention has import to many types of network data. For purposes of this invention, the term frame includes packet, cell, datagram, bridge protocol data unit packet, packet data and any equivalents thereof. In addition, the method and apparatus described in the present invention may be applied to a router, fabric, a switch, and any equivalents thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of handling a frame in an electronic network device, the method comprising:
   receiving a frame having multiple field values at a port of the electronic network device;
   parsing the received frame to obtain the field values and generating two or more slices from the received frame, wherein each slice contains at least some of the parsed field values including a source port field value and a frame format field value;
   applying the two or more slices to a search engine having a rules table, wherein each rule in the rules table has a common header comprising a source port identifier specifying the port or ports to which the rule applies and a frame format identifier specifying the frame format to which the rule applies, wherein the source port identifier specifies that the rule applies to frames received on at least one of a specific port, an even port or any port, and the frame format identifier specifies the rule applies to at least one of 1 q_tagged frames, double_tagged frames, 802_2 frames, CPU frames, tagged frames, stacked frames, or stacked and tagged frames;
   determining matching rules by matching information in the two or more slices with information in the common header of each rule in the rules table by executing a parallel comparison at wire speed between the information in the two or more slices and the information in the common header of each rule in the rules table;
   selecting a highest priority rule from the matching rules;
   using the address of the highest priority rule to index a policy table to obtain an action to perform on the received frame; and
   performing the action obtained from the policy table on the received frame.

2. The method as recited in claim 1, wherein performing the action obtained from the policy table on the received frame comprises performing at least one of dropping the frame, replacing field values in the frame, redirecting the frame, changing the forwarding port map, adding a forwarding port, assigning a frame priority or changing the frame's VLAN tag.

3. The method as recited in claim 1, wherein using the highest priority rule to index the policy table comprises using the address of the highest priority rule as an index into the policy table.

4. The method as recited in claim 1, wherein parsing the received frame to obtain the field values comprises parsing the received frame to obtain user defined field values for at least one of the two or more slices.

5. The method as recited in claim 1, wherein the rules in the rules table are programmed as entries in a Ternary Content Addressable Memory (TCAM).

6. The method as recited in claim 1, wherein at least three slices are generated from the received frame, and the field values contained in a third slice include source_port, frame format, tag_id, VLAN_tag, Length/Type, IP_protocol, IP_version, IP_DSCP, IP_TTL, and UDF field values, where TTL is a time-to-live field value and UDF is a user defined field value.

7. The method as recited in claim 1, wherein at least three slices are generated from the received frame, and the field values contained in a third slice include source_port, frame_format, IP_DA, L4_destination_port, L4_source_port, and UDF field values, where DA is a destination address field value and UDF is a user defined field value.

8. The method as recited in claim 1, further comprising processing the frame at a rate defined by a rate meter.

9. The method as recited in claim 1, wherein the number of slices generated from the frame depends upon the bandwidth required to process the frame.

10. An electronic network device to handle a frame, comprising:
    a rules table, wherein each rule in the rules table has a common header comprising a source port identifier specifying the port or ports to which the rule applies, and a frame format identifier specifying the frame format to which the rule applies, wherein the source port identifier specifies that the rule applies to frames received on at least one of a specific port, an even port or any port, and the frame format identifier specifies the rule applies to at least one of 1 q_tagged frames, double_tagged frames, 802_2 frames, CPU frames, tagged frames, stacked frames, or stacked and tagged frames;
    a port for receiving a frame, with the frame having multiple field values;

a pre-parser for parsing a received frame to obtain its field values and for generating two or more slices from the received frame, wherein each slice contains at least some of the parsed field values including a source port field value and a frame format field value;

a search engine for receiving the two or more slices, determining matches between information contained in the slices and the common header of each rule in the rules table by executing a parallel comparison at wire speed between the information contained in the two or more slices and the information contained in the common header of each rule in the rules table, and selecting a highest priority matching rule;

a policy table indexed by the address of the highest priority matching rule, for determining an action to perform on the received frame; and an action resolution unit for acting on the received frame according to the action obtained from the policy table.

11. The network device as recited in claim 10, further comprising: a rate meter defining a rate each frame or slice is to be processed and output.

12. The network device as recited in claim 10, wherein the action comprises at least one of dropping the frame, replacing field values in the frame, redirecting the frame, changing the forwarding port map, adding a forwarding port, assigning a frame priority or changing VLAN tag.

13. The network device as recited in claim 10, wherein the rules table comprises the contents of a Ternary Content Addressable Memory (TCAM).

14. The network device as recited in claim 10, wherein the pre-parser parses the received frame into at least three slices, and the field values contained in a third slice includes source_port, frame format, tag_id, VLAN_tag, Length/Type, IP_protocol, IP_version, IP_DSCP, IP_TTL, and UDF field values, where TTL is a time-to-live field value and UDF is a user defined field value.

15. The network device as recited in claim 10, wherein the pre-parser parses the received frame into at least three slices, and the field values contained in a third slice includes source_port, frame_format, IP_DA, L4_destination_port, L4_source_port, and UDF field values, where DA is a destination address field value and UDF is a user defined field value.

16. The network device as recited in claim 10, wherein the number of slices generated from the frame depends upon the bandwidth required to process the frame.

17. The network device as recited in claim 10, wherein the pre-parser parses the received frame to obtain user defined field values for at least one of the two or more slices.

18. A method of handling a frame in an electronic network device, the method comprising:

receiving a frame having multiple field values at a port of the electronic network device;

parsing the received frame to obtain the field values and generating two or more slices containing information parsed from the received frame, wherein the information contained in a first corresponding slice is predefined and includes the source port, frame format, destination MAC address and source MAC address, and the information contained in a second corresponding slice is programmable;

applying the two or more slices to a search engine having a rules table, wherein each rule in the rules table has a common header comprising a source port identifier specifying the port or ports to which the rule applies and a frame format identifier specifying the frame format to which the rule applies;

determining matching rules by matching information in the two or more slices with information in the common header of each rule in the rules table, wherein the matching rules are determined by executing a parallel comparison at wire speed between the information in the two or more slices and the information in the common header of each rule in the rules table;

selecting a highest priority rule when multiple matching rules are found;

using the address of the highest priority matching rule to index a policy table to obtain an action to perform on the received frame; and performing the action obtained from the policy table on the received frame.

19. The method as recited in claim 18, wherein performing the action obtained from the policy table on the received frame comprises performing at least one of dropping the frame, replacing field values in the frame, redirecting the frame, changing the forwarding port map, adding a forwarding port, assigning a frame priority or changing the frame's VLAN tag.

20. The method as recited in claim 18, wherein using the highest priority rule to index the policy table comprises using the address of the highest priority rule as an index into the policy table.

21. The method as recited in claim 18, wherein parsing the received frame to obtain the field values comprises parsing the received frame to obtain user defined field values for at least one of the two or more slices.

22. The method as recited in claim 18, wherein the rules in the rules table are programmed as entries in a Ternary Content Addressable Memory (TCAM).

23. The method as recited in claim 18, wherein at least three slices are generated from the received frame, and the field values contained in a third slice include source_port, frame_format, tag_id, VLAN_tag, Length/Type, IP_protocol, IP_version, IP_DSCP, IP_TTL, and UDF field values, where TTL is a time-to-live field value and UDF is a user defined field value.

24. The method as recited in claim 18, wherein at least three slices are generated from the received frame, and the field values contained in a third slice include source_port, frame_format, IP_DA, L4_destination_port, L4_source_port, and UDF field values, where DA is a destination address field value and UDF is a user defined field value.

25. The method as recited in claim 18, further comprising processing the frame at a rate defined by a rate meter.

26. The method as recited in claim 18, wherein the number of slices generated from the frame depends upon the bandwidth required to process the frame.

27. An electronic network device to handle a frame, comprising:

a rules table, wherein each rule in the rules table has a common header comprising a source port identifier specifying the port or ports to which the rule applies, and a frame format identifier specifying the frame format to which the rule applies;

a port for receiving a frame, with the frame having multiple field values;

a pre-parser for parsing a received frame to obtain its field values and for generating two or more slices containing information parsed from the received frame, wherein the information contained in a first corresponding slice is predefined and includes the source port, frame format, destination MAC address and source MAC address, and the information contained in a second corresponding slice is programmable;

a search engine for receiving the two or more slices and determining matches between information contained in the slices and the common header of each rule in the rules table, wherein the search engine determines the matches by executing a parallel comparison at wire speed between the information in the slices and the information in the common header of each rule in the rules table, selects a highest priority rule when multiple matches are found;

a policy table indexed by the addresses of the matched rules, for determining an action to perform on the received frame based on the address of the highest priority matched rule; and an action resolution unit for acting on the received frame according to the action obtained from the policy table.

28. The network device as recited in claim 27, further comprising: a rate meter defining a rate each frame or slice is to be processed and output.

29. The network device as recited in claim 27, wherein the action comprises at least one of dropping the frame, replacing field values in the frame, redirecting the frame, changing the forwarding port map, adding a forwarding port, assigning a frame priority or changing VLAN tag.

30. The network device as recited in claim 27, wherein the rules table comprises the contents of a Ternary Content Addressable Memory (TCAM).

31. The network device as recited in claim 27, wherein the pre-parser parses the received frame into at least three slices, and the field values contained in a third slice includes source_port, frame_format, tag_id, VLAN_tag, Length/Type, IP_protocol, IP_version, IP_DSCP, IP_TTL, and UDF field values, where TTL is a time-to-live field value and UDF is a user defined field value.

32. The network device as recited in claim 27, wherein the pre-parser parses the received frame into at least three slices, and the field values contained in a third slice includes source_port, frame_format, IP_DA, L4_destination_port, L4_source_port, and UDF field values, where DA is a destination address field value and UDF is a user defined field value.

33. The network device as recited in claim 27, wherein the number of slices generated from the frame depends upon the bandwidth required to process the frame.

34. The network device as recited in claim 27, wherein the pre-parser parses the received frame to obtain user defined field values for at least one of the two or more slices.

* * * * *

UNITED STATES PATENT AND TRADEMARK OFFICE
CERTIFICATE OF CORRECTION

| | | |
|---|---|---|
| PATENT NO. | : 7,869,411 B2 | Page 1 of 1 |
| APPLICATION NO. | : 11/444373 | |
| DATED | : January 11, 2011 | |
| INVENTOR(S) | : Shrjie Tzeng | |

It is certified that error appears in the above-identified patent and that said Letters Patent is hereby corrected as shown below:

In column 10, line 36-37, in claim 6, delete "frame format," and insert -- frame_format, --, therefor.

In column 11, line 33, in claim 14, delete "frame format," and insert -- frame_format, --, therefor.

Signed and Sealed this
Fourth Day of October, 2011

David J. Kappos
*Director of the United States Patent and Trademark Office*